(12) United States Patent
Park et al.

(10) Patent No.: US 7,893,834 B2
(45) Date of Patent: Feb. 22, 2011

(54) POWER CONTROL METHOD FOR MOBILE RFID READER AND RFID READER USING THE SAME

(75) Inventors: Chan-Won Park, Daejon (KR);
Dong-Han Lee, Daejon (KR);
Hoe-Sung Yang, Seoul (KR); Gil-Young Choi, Daejon (KR); Cheol-Sig Pyo, Daejon (KR); Jong-Suk Chae, Daejon (KR); Joo-Moon Lee, Gyeonggi-do (KR); Gene-Hee Yoon, Seoul (KR); Taejeen Shin, Syosset, NY (US)

(73) Assignees: Electronics and Telecommunications Research Institute, Daejon (KR); SK Telecom Co., Ltd., Seoul (KR)

( * ) Notice: Subject to any disclaimer, the term of this patent is extended or adjusted under 35 U.S.C. 154(b) by 885 days.

(21) Appl. No.: 11/607,502

(22) Filed: Nov. 29, 2006

(65) Prior Publication Data
US 2007/0126553 A1 Jun. 7, 2007

(30) Foreign Application Priority Data
Dec. 1, 2005 (KR) ............... 10-2005-0116123
May 11, 2006 (KR) ............... 10-2006-0042576

(51) Int. Cl.
G08B 13/14 (2006.01)
(52) U.S. Cl. ............ 340/572.1; 340/10.1; 340/539.3; 340/693.3; 340/636.1; 455/574; 455/127.1
(58) Field of Classification Search ............ 340/10.1
See application file for complete search history.

(56) References Cited

U.S. PATENT DOCUMENTS

| | | | | |
|---|---|---|---|---|
| 5,973,613 A | * | 10/1999 | Reis et al. ............ | 340/7.23 |
| 6,211,790 B1 | * | 4/2001 | Radomsky et al. ........ | 340/573.4 |
| 6,343,222 B1 | * | 1/2002 | Jones ................. | 455/574 |
| 6,744,357 B2 | * | 6/2004 | Itou et al. ............ | 340/445 |
| 7,003,332 B2 | * | 2/2006 | Linn ................. | 455/574 |
| 7,499,985 B2 | * | 3/2009 | Linjama et al. ......... | 709/220 |
| 2003/0148760 A1 | * | 8/2003 | Takayanagi ............ | 455/420 |
| 2005/0099289 A1 | * | 5/2005 | Arita et al. ........... | 340/539.1 |
| 2005/0164748 A1 | | 7/2005 | Kitaji | |
| 2006/0006234 A1 | * | 1/2006 | Mizutani et al. ......... | 235/451 |
| 2006/0052055 A1 | * | 3/2006 | Rowse et al. ........... | 455/41.1 |
| 2006/0238301 A1 | * | 10/2006 | Wu et al. .............. | 340/10.1 |
| 2006/0267730 A1 | * | 11/2006 | Steinke et al. .......... | 340/10.1 |
| 2007/0001816 A1 | * | 1/2007 | Lindley et al. .......... | 340/10.34 |
| 2008/0309490 A1 | * | 12/2008 | Honkanen et al. ........ | 340/572.1 |

* cited by examiner

*Primary Examiner*—Benjamin C Lee
*Assistant Examiner*—Curtis J King
(74) *Attorney, Agent, or Firm*—Ladas & Parry LLP (57) ABSTRACT

Provided is a power control method for a mobile Radio Frequency Identification (RFID) reader and an RFID reader using the same. The RFID reader includes: an RFID reader transmission/reception control unit for creating a message to be transmitted to an RFID tag and transmitting RFID tag information to a terminal control unit; a reader transmitting unit for encoding and modulating the created message; a power amplifier for amplifying an output signal; a reader receiving unit for demodulating and decoding the signal and transmitting the signal to the RFID reader transmission/reception control unit; and an RFID reader power control unit for controlling power, wherein when the RFID reader transmission/reception control unit receives a command for acquiring the RFID tag information, the RFID reader power control unit applies power to the power amplifier.

13 Claims, 4 Drawing Sheets

POWER CONTROL METHOD FOR MOBILE RFID READER AND RFID READER USING THE SAME

FIELD OF THE INVENTION

The present invention relates to a power control method for a mobile Radio Frequency Identification (RFID) reader and an RFID reader using the same; and, more particularly, to a power control method for a mobile RFID reader which minimizes power consumed for operating the mobile RFID reader mountable to a wireless communication terminal, and an RFID reader using the same.

DESCRIPTION OF RELATED ART

In general, Radio Frequency Identification (RFID) is a technology for recognizing, tracking and managing materials, animals or human beings with RFID tags by contactlessly reading or recording information from the RFID tag having identification information by using radio frequency. An RFID system includes a plurality of electronic tags or transponders, each of which has identification information and is attached to a material or an animal, and an RFID reader for reading or writing information in or not of the RFID tag.

RFID systems are divided into a mutual inducing type and an electromagnetic wave type according to a mutual communication method between the RFID reader and the tags. The RFID systems are also divided into an active type and a passive type based on whether the RFID tag is operated with its own power source. Also, RFID systems are divided into a long wave type, a medium wave type, a short wave type, a high frequency type, and an ultra high frequency (UHF) type based on a used frequency.

A ubiquitous sensor network (USN) system means a system where RFID tags are set up in places to detect environment information as well as identification information of a material with an RFID tag, and the RFID tags are connected to a network and managed in real-time. Ultimately, an object of the USN system realizes a communication environment regardless of the kind of a network, a device, and a service anytime and anywhere by giving computing and communication functions to all materials.

An ultra high frequency (UHF) band ranging from 860 MHz to 960 MHz is expected to be widely applied as a frequency band of RFID/USN wireless equipment. In Korea, passive-type RFID/USN wireless equipment is supposed to make an access according to a channel frequency occupying method including Frequency Hopping Spread Spectrum (FHSS) or Listen Before Talk (LBT) method in a channel bandwidth of 200 kHz in a range of 908.5 MHz to 914 MHz.

The FHSS method uses a frequency band of diverse channels to avoid interference and it moves to another frequency band when pre-set frequency occupying time is over. The FHSS is adopted in the U.S. having a wide frequency band to be used.

The LBT method detects an available channel before transmitting data and gets into communication only when the channel is vacant. It is adopted as a standard in Europe having a narrow frequency band to be used.

A Pulse Interval Encoding (PIE) method is used as an encoding method of the RFID readers. A Double-SideBand Amplitude-Shift Keying (DSB-ASK) method, a Single-Side-Band Amplitude-Shift Keying (SSB-ASK) method, or a Phase-Reversal Amplitude-Shift Keying (PR-ASK) method is used as a modulation method. A Frequency Modulation 0 (FM0) method or a Miller Sub-carrier method is used as an encoding method of the RFID tag. An Amplitude-Shift Keying (ASK) or a Phase-Shift Keying (PSK) method is used as the modulation method.

Researchers are trying to connect an RFID system including the RFID reader and the RFID tags to a commercial mobile communication network to use the RFID in diverse fields and activate an RFID service. Accordingly, it is required to develop a technology for realizing an RFID reader function as a single chip such as MRF SoC to easily load the RFID in a mobile device such as the wireless communication terminal. When the RFID function is executed in the form of the MRF SoC, a method for minimizing power consumption is required to apply the MRF SoC to the mobile device having a limited power source such as the wireless communication terminal.

SUMMARY OF THE INVENTION

It is, therefore, an object of the present invention to provide a power control method for a mobile Radio Frequency Identification (RFID) reader which minimizes power consumed for operating the mobile RFID reader mountable to a mobile device having a limited power source such as a wireless communication terminal, and an RFID reader using the same.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided an RFID reader mountable to a wireless communication terminal, the RFID reader including: an RFID reader transmission/reception control unit for creating a message to be transmitted to an RFID tag and transmitting RFID tag information acquired from the RFID tag to a terminal control unit of the wireless communication terminal; a reader transmitting unit for encoding and modulating the created message; a power amplifier for amplifying an output signal of the RFID reader transmitting unit; a reader receiving unit for demodulating and decoding the signal transmitted from the RFID tag and transmitting the signal to the RFID reader transmission/reception control unit; and an RFID reader power control unit for controlling power applied to the RFID reader transmission/reception control unit, the RFID reader transmitting unit, the power amplifier and the RFID reader receiving unit, wherein when the RFID reader transmission/reception control unit receives a command for acquiring the RFID tag information from the terminal control unit, the RFID reader power control unit applies power to the power amplifier.

The RFID reader transmitting unit includes a encoding unit for encoding a message created in the RFID reader transmission/reception control unit, a modulating unit for performing digital modulation on coded data, a digital-to-analog (DA) converter for converting the digital modulated-signal into an analog signal and an RF transmitting unit for performing frequency up-conversion on the converted analog signal. The encoding unit performs Pulse Interval Encoding (PIE) and the RFID reader transmitting unit performs frequency up-conversion on the converted analog signal into a Ultra High Frequency (UHF) band.

In accordance with another aspect of the present invention, there is provided a method for controlling power in an RFID reader, which includes an RFID reader transmission/reception control means creating a message to be transmitted to an RFID tag, a reader transmitting means for encoding and modulating the created message, a power amplifier for amplifying an output signal of the RFID reader transmitting means, and a reader receiving means for demodulating and decoding the signal transmitted from the RFID tag and transmitting the decoded signal to an RFID reader transmission/reception control means, and receives an RFID reader operation command from a terminal control unit of a wireless communication terminal, the method including the steps of: a) receiving a read command for acquiring RFID tag information from the terminal control means by communicating with the RFID tag; and b) applying power to a power amplifier after receiving the read command.

The demodulating unit performs Amplitude Shift Keying (ASK) and the decoding unit performs Frequency Modulation 0 (FM0) or Miller Subcarrier decoding.

In the RFID reader of the present invention, when an RFID reader function is selected from the terminal control means, power is preferentially applied to the RFID transmission/reception control means. Also, when the RFID reader transmission/reception control means receives a command for acquiring the RFID tag information from the terminal control means, the RFID reader power control means additionally applies power to the RFID reader transmitting means, the power amplifier and the RFID reader receiving means. When the RFID reader transmission/reception control means acquires the RFID tag information, the RFID reader power control means turns off power applied to the RFID reader transmitting means, the power amplifier and the RFID reader receiving means.

When the RFID reader adopts a Listen Before Talk (LBT) method, the RFID reader should preferentially detect a channel to communicate with the RFID tag. Accordingly, when the RFID reader transmission/reception control unit receives a command for acquiring RFID tag information from the terminal control unit, the RFID reader power control unit additionally applies power to ⊨the RFID reader receiving unit. Also, the RFID reader receiving unit measures Received Signal Strength Indication (RSSI) of a reception channel signal and notifies the result to the RFID reader transmission/reception control unit.

When the RFID reader transmission/reception control unit detects the channel to communicate with the RFID tag, the RFID reader power control unit additionally applies power to the RFID reader transmitting unit and the power amplifier. Subsequently, when the RFID reader transmission/reception control unit acquires the RFID tag information, the RFID reader power control unit turns off power applied to the RFID reader transmitting unit, the power amplifier and the RFID reader receiving unit. Meanwhile, when power is applied to detect a channel, the RFID reader power control unit can apply power only to the FID reader transmission/reception control unit, the RF receiving unit, the AD converter and the demodulating unit, which are required for measuring RSSI among components of the RFID reader receiving unit.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
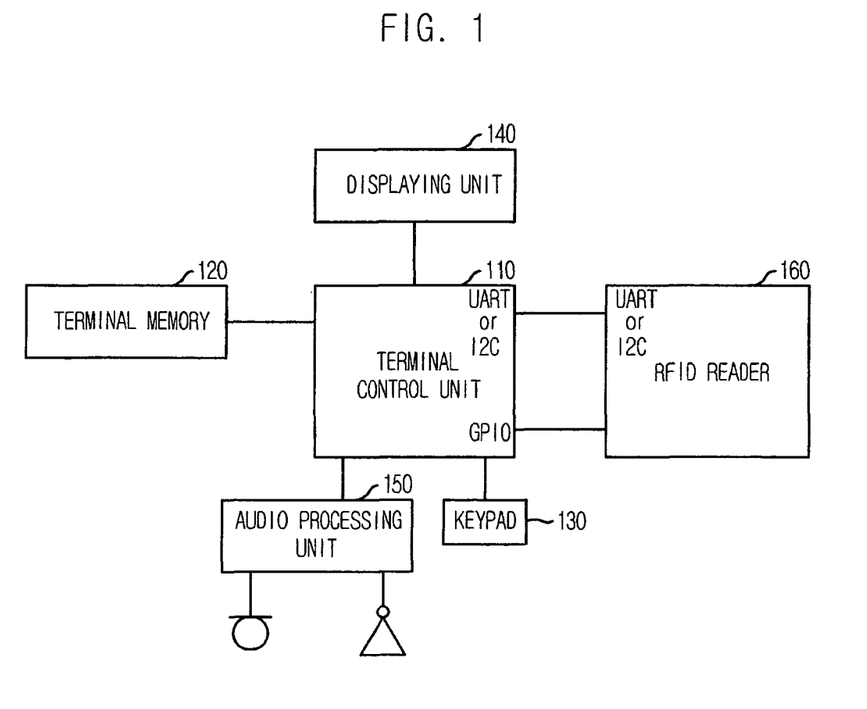
FIG. 1 is a block diagram showing a wireless communication terminal including a mobile Radio Frequency Identification (RFID) reader in accordance with an embodiment of the present invention.

FIG. 1 is a block diagram showing a wireless communication terminal including a mobile Radio Frequency Identification (RFID) reader in accordance with an embodiment of the present invention.

A terminal memory 120 includes a program memory and a data memory. The program memory can store programs for controlling a general call operation of a portable wireless communication terminal and programs for performing a mobile RFID service and displaying the result. Also, the data memory temporarily stores data generated during the operation of the programs.

An audio processing unit 150 restores a reception audio signal outputted from the terminal control unit or transmits a transmission audio signal generated from a microphone to the control unit.

A keypad 130 includes keys for inputting number and letter information and function keys for setting up diverse functions. The keypad 130 can further include function keys for inputting a read command to the mobile RFID reader to wait for operation or to read RFID tag information.

A displaying unit 140 displays a performance result of the mobile RFID service on a Liquid Crystal Display (LCD).

A terminal control unit 110 controls general operation of the wireless communication terminal. The terminal control unit 110 transmits with a wait command or a command for communication an RFID tag to the mobile RFID reader, which will be called an RFID reader hereinafter, and receives RFID tag information from the RFID reader. Also, the terminal control unit 110 selects Frequency Hopping Spread Spectrum (FHSS) or Listen Before Talk (LBT) as a frequency occupying method to be used for communication between the RFID reader and the RFID tag.

An RFID reader 160 receives an RFID reader wait command or a command for starting a communication with the RFID tag through Universal Asynchronous Receiver/Transmitter (UART) or Integrated Circuit (I2C) from the terminal control unit. When the command is transmitted, communication with the RFID tag is performed according to an RFID protocol based on the LBT or FHSS method. RFID tag information acquired through the communication with the RFID tag is transmitted to the terminal control unit. An RFID reader transmission/reception control unit 210 and an RFID reader power control unit 240 of the RFID reader 160 are woke up by input of a general purpose input/output (GPIO) pin of the terminal control unit 110 or by an external switch of the RFID reader 160. The RFID reader transmission/reception control unit 210 and the RFID reader power control unit 240 of the woken RFID reader 160 controls power of each unit of the RFID reader 160 as shown in FIG. 2 to consume only required power according to the steps of the RFID reader operation.

Figure 2:
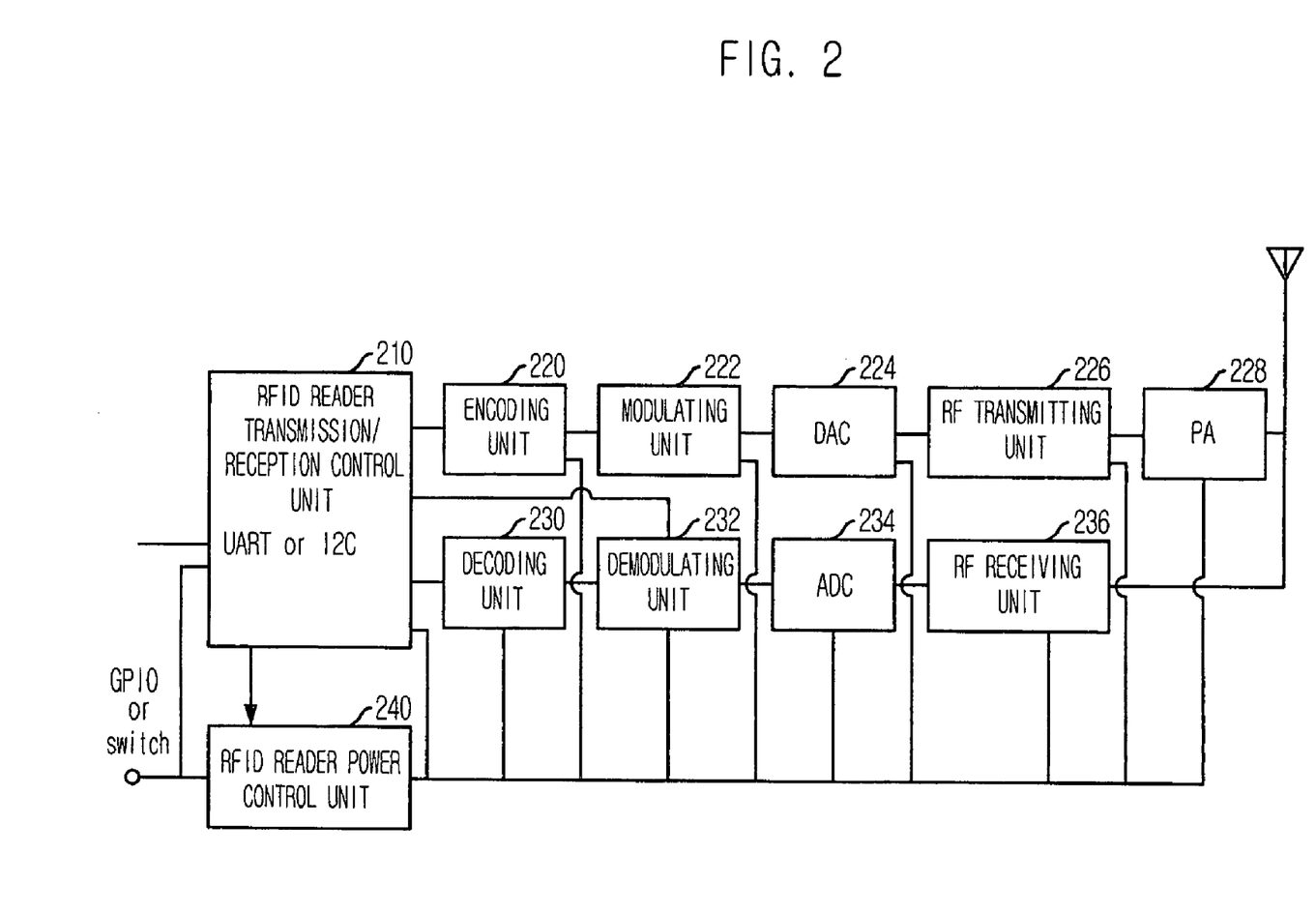
FIG. 2 is a block diagram showing the mobile RFID reader using a power control method in accordance with the embodiment of the present invention.

FIG. 2 is a block diagram showing the mobile RFID reader 160 using the power control method in accordance with an embodiment of the present invention.

The mobile RFID reader of the present invention includes the RFID reader transmission/reception control unit 210 connected to the terminal control unit through the UART or I2C, an encoding unit 220, a modulating unit 222, a digital to analog converter (DA converter) 224, an RF transmitting unit 226, a power amplifier (PA) 228, an RF receiving unit 236, an analog to digital Converter (AD converter) 234, a demodulating unit 232, a decoding unit 230, and an RFID reader power control unit 240 for controlling power of each unit of the RFID reader.

When the RFID reader transmission/reception control unit 210 receives a wait command from the terminal control unit 110, the RFID reader transmission/reception control unit 210 executes setting required for operating the RFID reader and waits to receive a read command for starting a communication with the RFID tag. When the read command is transmitted from the terminal control unit 110, the RFID reader transmission/reception control unit 210 starts to communicate with the RFID tag according to the RFID reader protocol. When the RFID reader occupies a frequency channel for the communication with the RFID tag, the RFID reader transmission/reception control unit 210 performs control for the RFID reader not to collide with other readers and controls LBT and FHSS. When the LBT frequency occupying method is used in the communication with the RFID tag, the RFID reader transmission/reception control unit 210 detects a vacant channel to be used in the communication with the RFID tag and starts to communicate with the RFID tag. When an international standard ISO/IEC 18000-6C is adopted, the RFID reader uses 'Select', 'Inventory', and 'Access' processes and acquires the RFID tag information including Electronic Product Code (EPC) from the RFID tag.

Commands such as 'Query', 'QueryAdjust', 'QueryRep', and 'Ack' can be used in the 'Inventory' process. Commands such as 'Req_RN', 'Read', and 'Write' can be used in the 'Access' process.

Meanwhile, the RFID reader of the present invention can further include an RFID reader memory (not shown) for storing the RFID tag information acquired from the program operated in the RFID reader transmission/reception control unit 210 and the RFID tag. The power control of the RFID reader memory is operated in the same way as the power control of the RFID reader transmission/reception control unit.

The encoding unit 220 encodes the command transmitted from the RFID reader transmission/reception control unit 210. When the international standard ISO/IEC 18000-6C is adopted, the encoding unit 220 performs Pulse-Internal encoding (PIE). Also, the modulating unit 222 receives data encoded in the encoding unit, creates a wave form for DSB-ASK or PR-ASK modulation and performs shaping. The DA converter 224 converts a digital signal outputted from the modulating unit 222 into an analog signal and the RF transmitting unit 226 performs frequency up-conversion onto the converted analog signal. The RF transmitting unit 226 performs frequency up-conversion into the UHF band ranging from 860 MHz to 960 MHz onto the analog signal transmitted from the DA converter according to the ISO/IEC 18000-6C standard.

The power amplifier 228 amplifies power of signal, on which the frequency up-conversion is performed, and emits the signal through an antenna. In the RFID reader, the power amplifier 228 consumes most of power to be consumed when all units of the RFID reader are operated in the RFID reader. The power consumption of the power amplifier 228 accounts for 70 to 80% of the power. Therefore, the power of the power amplifier 228 should be efficiently managed to reduce power consumption of the RFID reader. The power control method will be described in detail with reference to FIG. 3.

Meanwhile, the RF receiving unit 236 performs frequency down-conversion on the signal, onto which backscatter modulation is performed in the RFID tag transmitted through the antenna, and transmits the signal to the AD converter. The AD converter 234 converts the analog signal, on which the frequency down-conversion is performed, into the digital signal.

The demodulating unit 232 receives the converted digital signal from the AD converter, performs ASK demodulating and detects Preamble. Also, when the RFID reader adopts the LBT frequency occupying method, the demodulating unit 232 measures Received Signal Strength Indication (RSSI) of the signal transmitted from the AD converter and transmits the measured result to the RFID reader transmission/reception control unit 210. The reader transmission/reception control unit 210 compares the RSSI with a pre-set reference value and determines whether a channel is vacant.

The decoding unit 230 receives the signal, on which the ASK demodulation is performed in the demodulating unit, decodes the signal, and transmits the decoded signal to the RFID reader transmission/reception control unit. The decoding unit 230 performs FM0 or Miller Sub-carrier decoding based on the international standard ISO/IEC 18000-6C.

The power should be applied to the RFID reader control unit 210 and the RFID reader power control unit 240 of the RFID reader 160 by input of the GPIO pin of the terminal control unit 110 or the external switch of the RFID reader 160 to operate the RFID reader. The RFID reader control unit 210 and the RFID reader power control unit 240 of the woken RFID reader 160 controls power of each unit of the RFID reader 160 as shown in FIG. 3 to apply power of only the units requiring operations according to steps of the reader operation.

The RFID reader power control unit 240 of the present invention applies power to only the units of the RFID reader, which are required for reader operation according to the situation or steps of the operation of the reader notified from the RFID reader transmission/reception control unit 210. Therefore, the RFID reader power control unit 240 is connected to each unit of the RFID reader including the RFID reader transmission/reception control unit 210, the encoding unit 220, the modulating unit 222, the DA converter 224, the RF transmitting unit 226, the power amplifier 228, the decoding unit 230, the demodulating unit 232, the AD converter 234, and the RF receiving unit 236 and controls power of each unit.

Figure 3:
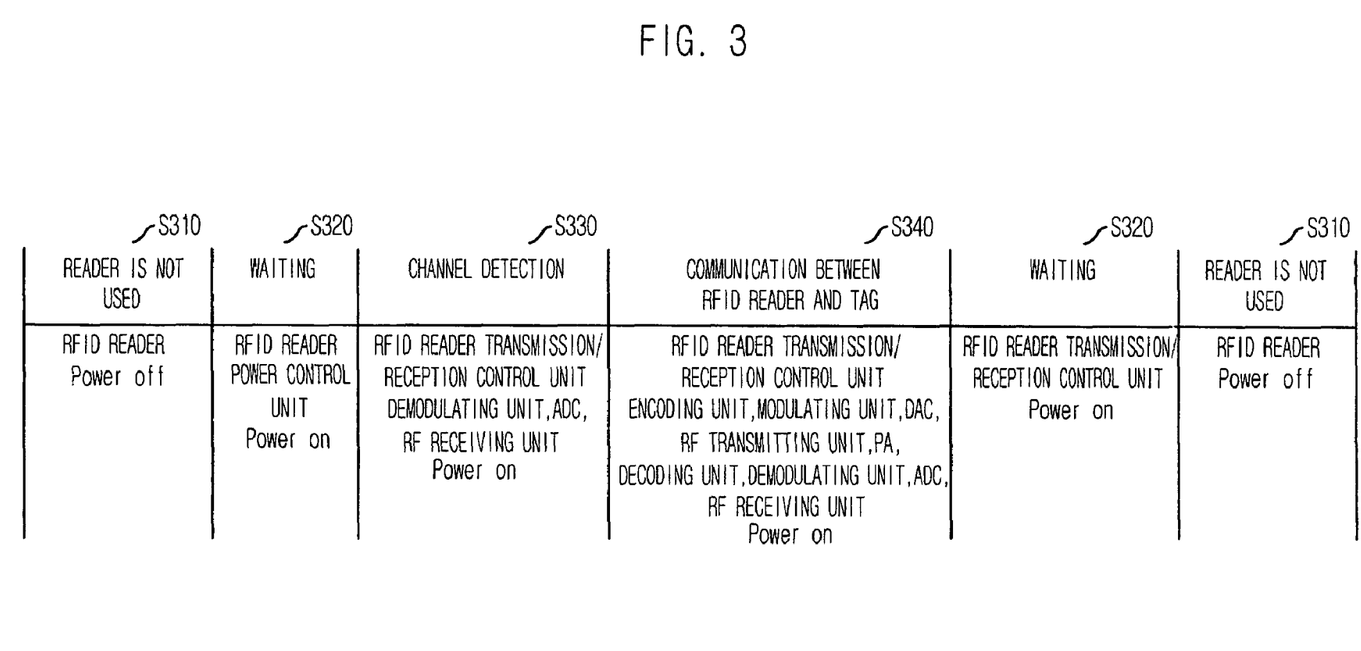
FIG. 3 describes the power control method according to the steps of the RFID reader operation in accordance with an embodiment of the present invention.

FIG. 3 describes the power control method according to the steps of the RFID reader operation in accordance with an embodiment of the present invention.

In general, total power of a wireless communication terminal battery ranges from 4,200 mW to 7,000 mW. Also, when the RFID reader is operated, most power is consumed in the RF unit, more particularly, in the power amplifier. That is, since power ranging from 800 mW to 1,010 mW is consumed only in the power amplifier of the RFID reader, there is a problem that battery capacity of the mobile device is radically consumed in case that the power of the power amplifier is not efficiently managed. Therefore, the present invention suggests a method for efficiently managing power by applying only power of the units required according to the operation steps of the RFID reader.

At step S310, power is not applied to the RFID reader in a state that the RFID function is not used. That is, the RFID reader maintains a power off state.

When power is applied to the terminal control unit 110 and the RFID reader power control unit 240 to select the RFID function through an RFID reader power switch or the keypad 130, the RFID reader power control unit 240 supplies power only to the RFID reader transmission/reception control unit 210. The RFID reader transmission/reception control unit 210 receives a wait command from the terminal control unit and turns into the waiting state, which is a state before communication with the RFID tag. It notifies the terminal control unit that the RFID reader transmission/reception control unit 210 is in the normal waiting state. Consequently, power is applied only to the RFID reader control unit at the waiting step of S320 before performing communication with the RFID tag. The RFID reader can include the RFID reader memory (not shown) for storing a program and a setting value required for operation of the RFID reader control unit and controls power with respect to the RFID reader memory as the RFID reader control unit. Therefore, when the RFID reader is in the waiting state, power is applied to the RFID reader transmission/reception control unit 210 and the RFID reader memory, and the RFID reader can consume only about 100 mW of power which does not bring about any problem in the mobile device.

When a command for reading the RFID tag information is selected, the RFID reader power control unit 240 is operated differently according to whether the RFID reader adopts the LBT frequency occupying method or the FHSS frequency occupying method. The terminal control unit 110 or the RFID reader transmission/reception control unit 210 determines which one of LBT and FHSS will be operated as the frequency occupying method for communication with the RFID tag. The RFID reader transmission/reception control unit 210 notifies the RFID reader power control unit that the command for reading the RFID tag information is transmitted and which one of the LBT and the FHSS is selected as the frequency occupying method to be used in the communication with the RFID tag. The RFID reader power control unit 240 controls the power of the RFID reader properly to the notified frequency occupying method.

When the RFID reader adopts LBT as the frequency occupying method for communication with the RFID tag, the RFID reader power control unit 240 notified of the transmission of the read command additionally applies power to the demodulating unit 232, the AD converter 234, and the RF receiving unit 236. That is, the RFID reader detects a frequency channel at step S330 by using the RFID reader transmission/reception control unit 210, the demodulating unit 232, the AD converter 234, and the RF receiving unit 236, to which power is applied. When power is applied only to the units for detecting the frequency channel as described above, a channel to be used for communication with the RFID tag can be detected by using power of about 250 mW.

To be specific, the RFID reader transmission/reception control unit 210 creates a frequency channel index sequence for selecting a channel to be detected. The demodulating unit 212 measures RSSI of the channel signal according to the channel sequence and transmits the RSSI to the RFID reader transmission/reception control unit. The RFID reader transmission/reception control unit detects a vacant channel by comparing the transmitted RSSI with the pre-set reference value.

When the channel detecting process is described in detail, the RFID reader transmission/reception control unit 210 creates a frequency channel index sequence for selecting a channel to be detected. The RF receiving unit 236 performs frequency down-conversion on a signal of the channel according to a created frequency channel index sequence order and transmits the signal to the AD converter. The demodulating unit 232 measures the RSSI of the signal converted into the digital signal in the AD converter and transmits the RSSI of the signal to the RFID reader transmission/reception control unit 210. The RFID reader transmission/reception control unit 210 compares the RSSI of the transmitted channel signal with the pre-set threshold and determines whether the channel is vacant. When the vacant channel to be used for communication with the RFID tag is found through the channel detecting process, the RFID reader transmission/reception control unit 210 notifies the result to the RFID reader power control unit 240.

The embodiment of the present invention takes a process of receiving the signal converted into the digital signal in the demodulating unit and measuring the RSSI, but the RSSI can be measured on the analog signal. Herein, power is applied only to the RF receiving unit measuring the RSSI. Therefore, it should be understood in the present invention that power is applied only to the units for detecting the channel at the step that the RFID reader detects the channel.

The RFID reader power control unit 240 notified that the channel to be used for communication with the RFID tag is found from the RFID reader transmission/reception control unit 210 additionally applies power to the encoding unit 220, the modulating unit 222, the DA converter 224, the RF transmitting unit 226, the power amplifier 228, and the decoding unit 230. Consequently, power is applied to all units and the RFID reader communicates with the RFID tag through the detected channel at communicating step between the RFID reader and tag of S340. When power is applied to all units of the RFID reader as above, power of about 1,115 mW is consumed. The communication with the RFID tag is performed by transmitting power to be used by the RFID tag to a continuous wave (CW) and analyzing the signal, on which backscatter modulation is performed in the RFID tag. It takes about 10 msec to 50 msec to read one RFID tag. Therefore, power can be efficiently managed by minimizing the operation time of the power amplifier consuming a lot of power in operation of the RFID reader.

Meanwhile, when the FHSS is adopted as the frequency occupying method for communication between the RFID reader and the RFID tag, an individual channel detecting process is not required. Therefore, when a command to read the RFID tag by according to the FHSS is transmitted from the terminal control unit, the RFID reader power control unit 240 additionally applies power to the encoding unit 220, the modulating unit 222, the DA converter 224, the RF transmitting unit 226, the power amplifier 228, the decoding unit 230, the demodulating unit 232, the AD converter 234, and the RF receiving unit 236. That is, power is applied to all units of the RFID reader and the RFID reader communicates with the RFID tag according to the FHSS method based on the frequency channel index sequence created in the RFID reader transmission/reception control unit at RFID tag communicating step of S340. It takes only 10 msec to 50 msec to read one RFID tag, just as in the LBT method and power can be efficiently managed by minimizing the operating time of the power amplifier consuming a lot of power in operation of the RFID reader.

The RFID reader acquires the RFID tag information including Electronic Product Code (EPC) of the RFID tag by communicating with the RFID tag according to the LBT or FHSS frequency occupying method and transmits the RFID tag information to the terminal control unit 110. The RFID reader transmission/reception control unit 210 acquiring the RFID tag information ends communicating with the RFID tag and notifies the result to the RFID reader power control unit 240. The RFID reader power control unit 240 notified of the end of the communication with the RFID tag turns off power of the encoding unit 220, the modulating unit 222, the DA converter 224, the RF transmitting unit 226, the power amplifier 228, the decoding unit 230, the demodulating unit 232, the AD converter 234, and the RF receiving unit 236 at the waiting step of S320. That is, power of the units except the RFID reader transmission/reception control unit 210 of the RFID reader is cut off. In this case, power of the RFID reader memory (not shown) for temporally storing the RFID tag information is not cut off. Since power is applied only to the RFID reader transmission/reception control unit and the RFID reader memory at the waiting step of S320, the RFID reader can consume only power of about 100 mW which is not a burden to the mobile device.

The present invention controls power by minutely dividing the structure of the RFID reader 160 as shown in FIG. 2. However, since the encoding unit 220, the modulating unit 222, the decoding unit 230, and the demodulating unit 232 are generally digital parts with the boundary of the DA converter and the AD converter, and consume a small quantity of power, power can be applied to the encoding unit 220, the modulating unit 222, the decoding unit 230, and the demodulating unit 232 at the waiting step of S320 in FIG. 3. Power control of the DA converter, the AD converter, the RF transmitting part, the RF receiving unit, and the power amplifier should be understood as the core of the mobile RFID.

When the RFID tag information is successfully transmitted from the RFID reader transmission/reception control unit 210, the terminal control unit 110 turns off power of the RFID reader control unit 210 and the RFID reader power control unit 240 of the RFID reader 160. Consequently, when the terminal control unit receives the RFID tag information including EPC acquired through communication with the RFID tag from the RFID reader transmission/reception control unit, power of the RFID reader is cut off at the RFID reader non-using step of S310.

Figure 4:
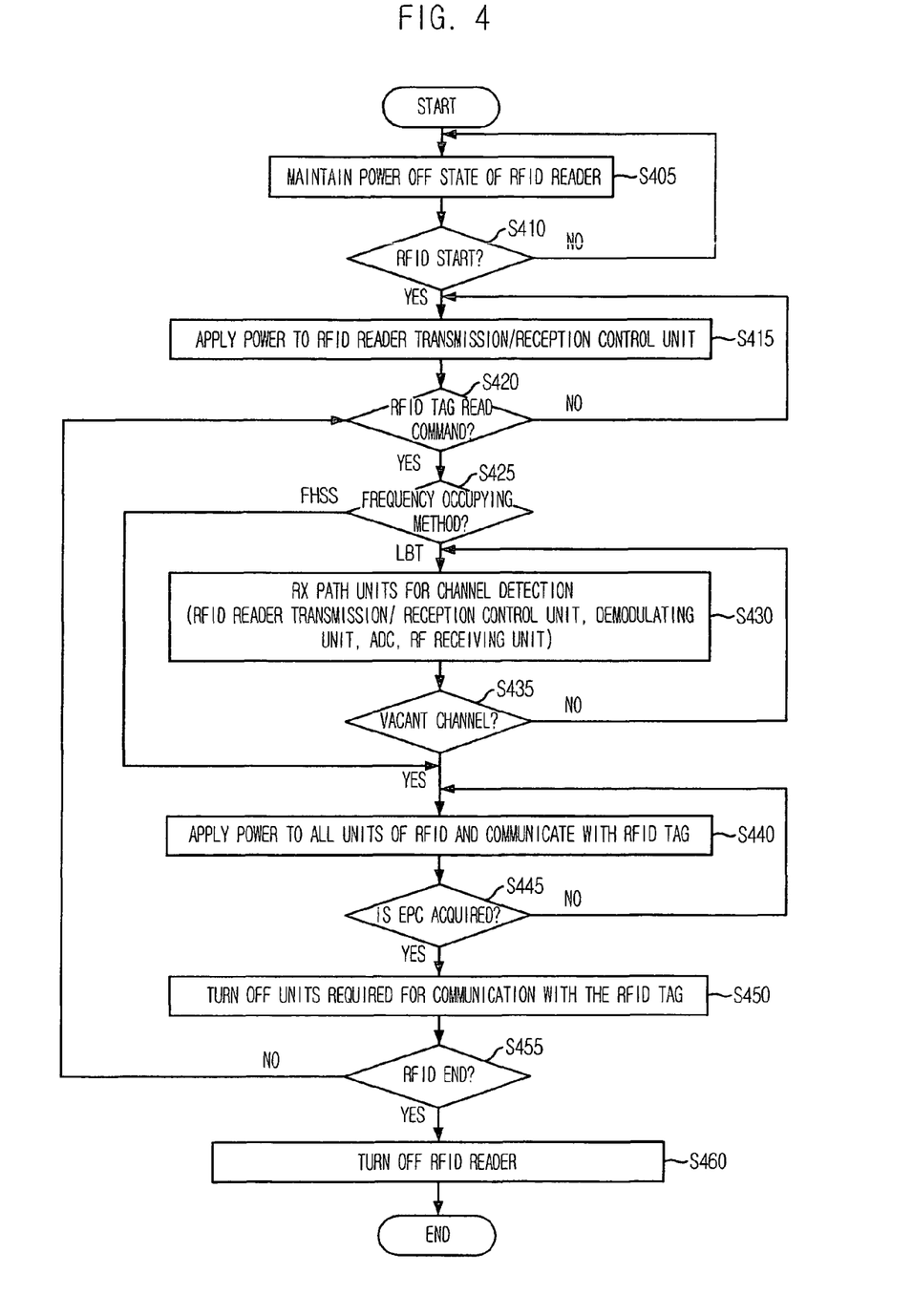
FIG. 4 is a flowchart describing a power control method of the mobile RFID reader in accordance with an embodiment of the present invention.

FIG. 4 is a flowchart describing a power control method of the mobile RFID reader in accordance with an embodiment of the present invention.

When the RFID reader is not used, the RFID reader maintains a power off state at step S405. When an RFID function is selected by a keypad or a switch at step S410, the terminal control unit 110 transmits a power control signal to the RFID reader transmission/reception control unit 210 and the RFID reader power control unit 240, and applies power at step S415. Power of the RFID reader memory is controlled the same manner as the power of the RFID reader transmission/reception control unit is controlled. Software upgrade of the RFID reader and other diverse functions except the communication function with the RFID tag can be performed in a reader waiting state that power is applied only to the RFID reader transmission/reception control unit 210 and the RFID reader memory (not shown).

When the RFID tag read command is transmitted from the terminal control unit, the power-supplied RFID reader transmission/reception control unit 210 notifies the RFID reader power control unit of the transmission of the RFID tag read command at step S420. The notified information can include information on the frequency occupying method of the RFID reader.

When the RFID reader adopts the LBT as the frequency occupying method at step S425, the RFID reader power control unit 240 additionally applies power to the units for channel detection including RSSI measurement at step S430. Since the demodulating unit measures RSSI and notifies the result to the RFID reader transmission/reception control unit 210 in the embodiment of the present invention, the RFID reader power control unit 240 additionally applies power to the demodulating unit 232, the AD converter 234, and the RF receiving unit 236. The RFID reader transmission/reception control unit 210 is notified of the RSSI of the channel according to the frequency channel index sequence and detects a vacant channel to be used for communication with the RFID tag at step S435. When the channel to be used for communication with the RFID tag is required, it is notified to the RFID reader power control unit. The notified RFID reader power control unit 240 applies power to all units of the RFID and communicates with the RFID tag according to the LBT method at step S440.

When the RFID reader adopts the FHSS as the frequency occupying method at step S425, the channel detecting process is not required. Accordingly, the RFID reader power control unit 240 notified transmission of the read command from the RFID reader transmission/reception control unit applies power to all units of the RFID reader and the RFID reader communicates with the RFID tag according to the FHSS method at steps S440.

When the RFID tag information including EPC is acquired through communication with the RFID tag at step S445, the RFID reader transmission/reception control unit 210 notifies the acquisition of the RFID tag information to the RFID reader power control unit 240. The notified RFID reader power control unit 240 turns off power of the units required for communication with the RFID tag except the RFID reader transmission/reception control unit and the RFID reader memory at step S450. That is, power of the encoding unit 220, the modulating unit 222, the DA converter 224, the RF transmitting unit 226, the power amplifier 228, the decoding unit 230, the demodulating unit 232, the AD converter 234, and the RF receiving unit 236 of FIG. 2 is turned off.

The RFID reader transmission/reception control unit 210 transmits the acquired the RFID tag information to the terminal control unit 110. The terminal control unit successfully receives the RFID tag information from the RFID reader transmission/reception control unit and receives a result on whether to end the RFID service through the keypad at step S455. When the terminal control unit receives the result that new RFID tag information is to be acquired, the terminal control unit retransmits the read command to the RFID reader transmission/reception control unit. When the terminal control unit receives a result that the RFID service is to be ended, power applied to the RFID reader is cut off at step S460.

The present invention provides the power control method for the mobile RFID reader which minimizes the quantity of power to be consumed for operating the mobile RFID reader mounted to the mobile device requiring limited power as the wireless communication terminal, and the RFID reader using the same.

The present invention can minimize power consumption of the mobile device by applying power only to the required units according to the operating steps of the mobile RFID reader. In particular, power of the RFID reader can be efficiently managed by applying power only to the steps of operating communication between the RFID reader and the RFID tag with respect to the power amplifier consuming most power in operation of the RFID reader. Also, the present invention can minimize power consumption of the RFID reader in operation of functions including software upgrade of the RFID reader not by applying power before starting communication with the RFID tag, but by applying power only to the RFID reader transmission/reception control unit and the RFID reader memory. Also, when the RFID reader adopts the LBT method in communication with the RFID tag, the present invention can minimize the operation time of the power amplifier consuming a lot of power by applying power only to the unit required for detecting the channel and performing channel detection.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent applications No. 2005-0116123 and No. 2006-0042576, filed with the Korean Intellectual Property Office on Dec. 1, 2005, and May 11, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A Radio Frequency Identification (RFID) reader mountable to a wireless communication terminal, comprising:
   an RFID reader transmission/reception control unit for creating a message to be transmitted to an RFID tag and transmitting RFID tag information acquired from the RFID tag to a terminal control unit of the wireless communication terminal;
   a reader transmitting unit for encoding and modulating the created message;
   a power amplifier for amplifying an output signal of the RFID reader transmitting unit;
   a reader receiving unit for demodulating and decoding the signal transmitted from the RFID tag; and
   an RFID reader power control unit for selectively controlling power applied to the RFID reader transmission/reception control unit, the RFID reader transmitting unit, the power amplifier and the RFID reader receiving unit accordingly to a predetermined sequence of operations of the RFID reader, which then allows the RFID reader power control unit to supply the power to either the RFID reader transmission/reception control unit, the RFID reader transmitting unit, the power amplifier and the RFID reader receiving unit or any combination thereof based on the predetermined sequence of operations being applied by the RFID reader in order reduce a consumption of power for the RFID reader,
   wherein when the RFID reader transmission/reception control unit receives a command for acquiring the RFID tag information from the terminal control unit, the RFID reader power control unit applies power to the power amplifier, and
   wherein the power is at a first consumption level,
   wherein only when an RFID reader function is selected from the terminal control unit, power is applied to the RFID transmission/reception control unit,
   wherein only when the RFID reader transmission/reception control unit receives a command for acquiring the RFID tag information from the terminal control unit, the RFID reader power control unit additionally applies power to the RFID reader transmitting unit, the power amplifier and the RFID reader receiving unit,
   wherein only when the RFID reader power control unit receives a command to acquire the RFID tag information from the terminal control unit according to a Listen Before Talk (LBT) method, the power control unit additionally applies power to the RFID reader receiving unit only,
   wherein the Listen Before Talk method detects an available channel before transmitting data and gets into communication only when the channel is vacant.

2. The RFID reader as recited in claim 1, wherein the RFID reader receiving unit includes:
   an RF receiver for performing frequency down-conversion on the signal transmitted from the RFID tag;
   an analog-to-digital (AD) converter for converting the frequency downward converted-signal into a digital signal;
   a demodulator for demodulating the converted digital signal; and
   a decoder for decoding and transmitting the demodulated signal to the RFID reader transmission/reception control unit.

3. The RFID reader as recited in claim 1, wherein when an RFID reader function is selected from the terminal control unit, power is applied to the RFID transmission/reception control unit.

4. The RFID reader as recited in claim 1, wherein when the RFID reader transmission/reception control unit acquires the RFID tag information, the RFID reader power control unit turns off power applied to the RFID reader transmitting unit, the power amplifier and the RFID reader receiving unit.

5. The RFID reader as recited in claim 1, wherein when the RFID reader transmission/reception control unit ends channel detection for communication with the RFID tag, the RFID reader power control unit additionally applies power to the RFID reader transmitting unit and the power amplifier.

6. The RFID reader as recited in claim 5, wherein when the RFID reader transmission/reception control unit acquires the RFID tag information, the RFID reader power control unit turns off power applied to the RFID reader transmitting unit, the power amplifier and the RFID reader receiving unit.

7. The RFID reader as recited in claim 2, wherein the demodulator measures Received Signal Strength Indication (RSSI) of a channel signal transmitted through an RFID reader antenna and notifies the measured result to the RFID reader transmission/reception control unit, and the RFID reader transmission/reception control unit compares the RSSI with a threshold and detects a channel to be used for communication with the RFID tag.

8. The RFID reader as recited in claim 7, wherein the command for acquiring the RFID tag information is transmitted from the terminal control unit, the RFID reader power control unit applies power to the RFID reader transmission/reception control unit, the RF receiver, the AD converter and the demodulator.

9. The RFID reader as recited in claim 8, wherein when the RFID reader transmission/reception control unit detects a channel to communicate with the RFID tag, the RFID reader power control unit additionally applies power to the decoder, the RFID reader transmitting unit and the power amplifier.

10. The RFID reader as recited in claim 9, wherein when the RFID reader transmission/reception control unit acquires the RFID tag information, the RFID reader power control unit cuts off power to the RFID reader transmitting unit, the power amplifier and the RFID reader receiving unit.

11. A method for controlling power in an Radio Frequency Identification (RFID) reader, which includes an RFID reader transmission/reception control unit creating a reader message to an RFID tag, a reader transmitting unit for encoding and modulating the reader message, a power amplifier for amplifying an output signal of the RFID reader transmitting unit, and a reader receiving unit for demodulating and decoding the signal transmitted from the RFID tag, and receives an RFID reader operation command from a terminal control unit of a wireless communication terminal, comprising the steps of:

a) receiving a read command for acquiring RFID tag information from the terminal control unit by communicating with the RFID tag; and b) applying power to the power amplifier after receiving the read command, applying power to either the RFID reader transmission/reception control unit, the RFID reader transmitting unit, the power amplifier and the RFID reader receiving unit or any combination thereof based on a predetermined sequence of operations being applied by the RFID reader in order reduce a consumption of power for the RFID reader, and wherein the power is at a first power consumption level, f) only when a power control signal for operating the RFID reader is initially inputted from the terminal control unit, applying power to the RFID reader transmission/reception control unit, g) only when the read command is transmitted from the terminal control unit, applying power to the RFID reader transmitting unit, the power amplifier and the RFID reader receiving unit, h) when the RFID tag information is acquired from the RFID tag, applying power to the RFID reader transmitting unit, the power amplifier and the RFID reader receiving unit, i) when the read command is transmitted from the terminal control unit, applying power to a Received Signal Strength Indication (RSSI) measuring unit of a reception channel signal for performing a Listen Before Talk (LBT) method, wherein the Listen Before Talk method detects an available channel before transmitting data and gets into communication only when the channel is vacant.

12. The method as recited in claim 11, further comprising the step of:

j) when a channel to be used for communication with the RFID tag is selected, applying power to the RFID reader transmitting unit and the power amplifier.

13. The method as recited in claim 12, further comprising the step of:

k) when the RFID tag information is acquired from the RFID tag, power applied to the RFID reader transmitting unit, the power amplifier and the RFID reader receiving unit is turned off.

* * * * *